Aug. 7, 1962  P. K. TRIMBLE  3,048,041
UNBALANCE INDICATOR
Filed Feb. 6, 1957  2 Sheets-Sheet 2

INVENTOR.
*Philip K. Trimble*
BY
*L. D. Burch*
ATTORNEY 3,048,041
UNBALANCE INDICATOR
Philip K. Trimble, Rochester, Mich., assignor to General Motors Corporation, Detroit, Mich., a corporation of Delaware
Filed Feb. 6, 1957, Ser. No. 638,517
5 Claims. (Cl. 73—462)

The present invention relates to balancing machines and more particularly to a machine for detecting the amount of dynamic unbalance in a rotating body.

In the past it has been the practice in detecting the amount of dynamic unbalance in a work piece to employ a machine that rotates the work piece and has various means therein to indicate the amplitude and/or the angular disposition of the unbalance in the rotating work piece.

It is now proposed to provide an unbalance detecting apparatus having an electronic circuit therein that is responsive to an unbalance signal produced by a rotating work piece. The circuit is adapted to analyze the unbalance signal and produce an indication of the magnitude and angular disposition of the unbalance. More particularly, this is accomplished by providing a vibration pick-up responsive to the dynamic unbalance in the work piece and effective to produce a signal characteristic thereof. The electronic circuit is interconnected with this pick-up and includes one branch having means responsive to the magnitude of the signal for indicating the amount of unbalance in the work piece and a second branch which is also responsive to a reference signal indicative of the angular displacement of the work piece and effective to indicate the phase relation between the reference signal and the unbalance signal to thereby indicate the angular disposition of the unbalance.

Figure 1:
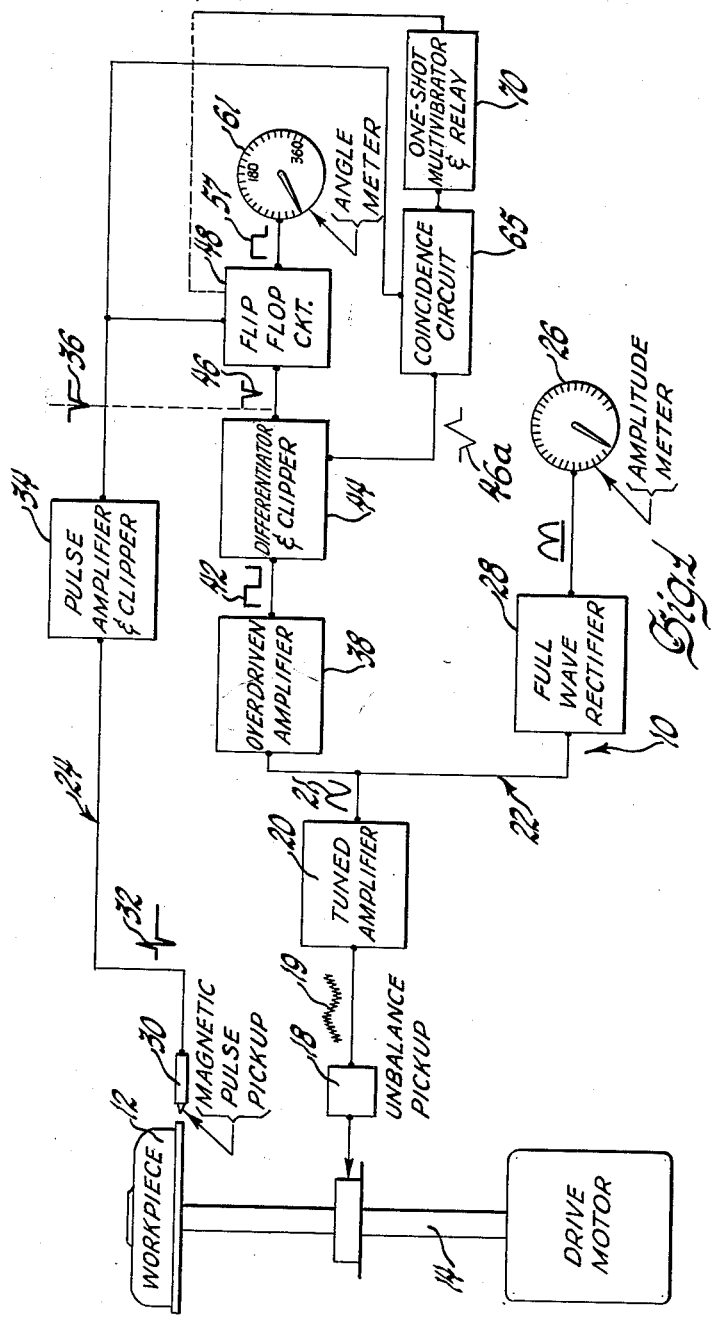
FIGURE 1 is a block diagram of an electronic balancing apparatus embodying the present invention.
Figure 2:
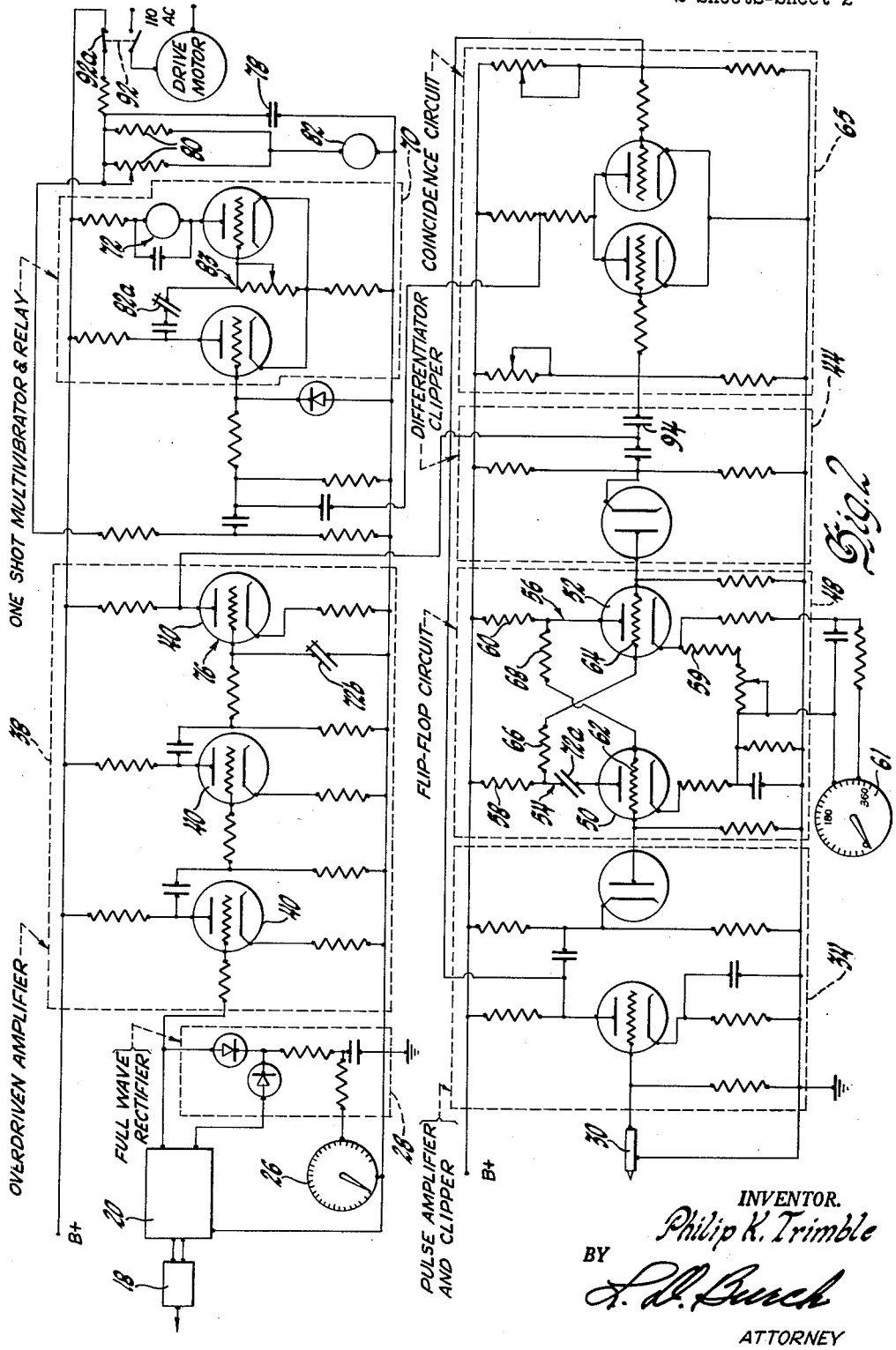
FIGURE 2 is a wiring diagram of a circuit suitable to be employed in the balancing apparatus of FIGURE 1.

Referring to the drawings in more detail, the present invention may be embodied in an apparatus 10 for measuring the amount of dynamic unbalance in a rotating work piece 12. This apparatus 10 includes a motor driven spindle 14 adapted to rotatably support the work piece 12 which it is desired to balance.

An unbalance pick-up 18 of any suitable type is employed to detect the vibrational movements of the work piece 12 produced by the unbalance in the work piece. This pick-up 18 is located in a postiion suitable for sensing the movement of the work piece 12 produced by the unbalance and will normally have an output comprising a sinusoidal signal 19 characteristic of the unbalance in the work piece. Not infrequently the signal 19 from the pick-up 18 will be weak and have a considerable amount of noise or spurious signals therein. Accordingly, the pick-up 18 is interconnected with an amplifier 20 which will increase the signal strength to a more useful level. In addition, the amplifier 20 is preferably tuned to the frequency of the unbalance signal 21 to eliminate any undesirable noises in the signal.

The output of the tuned amplifier 20 is interconnected with an amplitude branch 22 and an angle branch 24. The amplitude branch 22 includes a meter 26 effective to indicate the magnitude of the signal from the tuned amplifier 20. Instead of directly measuring the strength of the signal from the tuned amplifier 20, it has been found desirable to employ a full wave rectifier 28 that rectifies the amplified signal and a DC meter 26 that indicates the average of the rectified signal. The resultant reading on this meter 26 will be indicative of the amount of the unbalance in the work piece 12.

The angle branch 24, in addition to being responsive to the balance signal, includes a magnetic pick-up 30 which is responsive to an alnico slug or a similar device that will produce a reference signal 32 indicative of the angular position of the work piece 12. The pick-up 30 is interconnected with a pulse amplifier and clipper or rectifier circuit 34 that produces a reference pulse 36. The angle branch 24 also includes an over-driven amplifier 38 having the inlet thereof interconnected with the outlet of the tuned amplifier 20. The over-driven amplifier 38 includes one or more vacuum tubes 40 that are driven beyond their cut-off point to produce a substantially square wave output signal 42. The output of this amplifier 38 is then fed into a differentiating and clipping circuit 44. This circuit 44 is responsive to the square wave signal 42 and is effective to differentiate it to produce a positive pulse and a negative pulse coincident with the changes in polarity of the square wave. The positive pulse is clipped or eliminated by this circuit so that only a negative pulse 46 will appear in the output. The phase relation between pulses 36 and 46 will be indicative of the relation of the unbalance to the alnico slug or similar device. This phase shift is illustrated in FIGURE 1 as indicated by the dotted line extending between pulses 36 and 46. The output 46 of this differentiating and clipping circuit 44 is interconnected with one of the inputs to a flip-flop circuit 48. A second output pulse 46a which has been differentiated by capacitor 94 is interconnected to one of the inputs of a coincidence circuit 65 to be described later.

This flip-flop circuit 48 includes a pair of tubes 50, 52 having the plate circuits 54, 56 coupled to a high potential "B" voltage by separate plate loads 58, 60. The grid 62, 64 of each tube 50, 52 is connected to the plate of the other tube by a suitable resistance 66, 68. The grid 62 of the first tube 50 is interconnected with the output of the pulse amplifier and clipper 34 so as to be responsive to the reference pulse 36. The grid 64 of the other tube 52 is connected to the output of the differentiating and clipping circuit 44 so as to be responsive to the pulse 46 from the unbalance signal 21. It may thus be seen that the pulse amplifier and clipper circuit 34 will feed a negative reference pulse 36 indicative of the position of the work piece 12 into the grid 62 in the flip-flop circuit 48. This will cause the tube 50 to become non-conductive and tube 52 to become conductive. Tube 52 will continue to conduct until the differentiating and clipping circuit 44 feeds the negative pulse 46 from the unbalance signal 21 into the second grid 64. This will cause tube 52 to become non-conductive and tube 50 to become conductive. It will thus be seen that a series of pulses 57 will appear across the cathode resistor 59, the time duration of which will be determined by the phase relationship of the two trigger pulses 36 and 46. These pulses 57 are then fed into an averaging meter 61 that will indicate the phase relationship between the triggering pulses 36 and 46 or if calibrated properly will indicate the angular disposition of the point of unbalance relative to the alnico slug.

Although this appartus will accurately indicate the angular disposition of the point of unbalance, occasionally the point of unbalance will be located at approximately the same position as the alnico slug. When these points are coincident the meter 61 should read either zero or 360 degrees. However, as a practical matter, it has been found that although the negative pulse 46 and the synchronizing or reference pulse 36 are of very short duration, they have some finite width and if one pulse occurs at approximately the same time as the other pulse, the two pulses may tend to periodically overlap and periodically not overlap. When this phenomenon occurs the flip-flop circuit 48 will transmit an inaccurate and misleading signal to the meter 61. In order to prevent this condition a coincidence circuit 65 is disposed in parallel to the flip-flop circuit 48 so as to be responsive to both the reference pulse 36 and the differentiated unbalance pulse 46a. When the positive portion of pulse 46a and the clipped reference pulse 36 are not in overlapping phase relation the circuit will operate substantially as described above. However, when they do overlap the additive effect on the parallel amplifier of the coincidence circuit 65 will cause the output due to the sum of the simultaneous pulses to raise sufficiently to fire the one shot multi-vibrator 70 so as to de-energize the relay 72 for the full 360 degrees of the cycle. When the relay is thus de-energized the contacts 72a in the plate circuit 54 will be open and the contacts 72b in a grid circuit 76 in the overdrive amplifier 38 will close. This will prevent an unbalance pulse 46 appearing on the grid 64 of tube 52 and will prevent tube 50 from becoming conductive and simultaneously render tube 52 continuously conductive. Thus the meter 61 will have a steady full scale or 360° reading which will be indicative of the angular location of unbalance rather than producing a misleading reading somewhere between the two extremes.

In order to employ the present apparatus for measuring the unbalance in a work piece 12, the operator places the work piece 12 in position on the spindle 14 and starts the drive motor and allows the work piece 12 to reach the desired predetermined constant speed. Starting the motor by means of switch 92 will cause contact 92a to remove the potential from the condenser 78 which will then discharge through resistors 80. When the condenser 78 has discharged sufficiently, the relay 82 will close the contact 82a in the grid circuit 83 of the one shot multi-vibrator 70. The discharge of the condenser 78 enough to de-energize relay 82 will take slightly longer than is required for the drive motor and work piece to reach operating speed. Thus even though the pulses 36 and 46 may overlap during the starting operation, it will be impossible to activate the one shot multi-vibrator 70 during this period. The operator may then observe the amplitude and angle readings directly from the meters 26 and 61 or if it is desired some suitable electronic or mechanical clamping mechanism may be provided for retaining the amplitude and angle meters 26 and 61 in their indicating positions. The operator may then stop the rotation of the work piece 12 and proceed to make any desired balancing corrections on the work piece 12 as indicated by the amplitude and angle meters.

Various changes and modifications of the embodiment of the invention described herein may be made by those skilled in the art without departing from the spirit and principles of the invention.

I claim:

1. A measuring device for determining the dynamic unbalance in a work piece, said device comprising means for rotating said work piece, a reference pick-up adapted to produce a reference signal indicative of the angular disposition of said work piece, an unbalance pick-up adapted to produce a signal characteristic of the unbalance of said work piece, electronic switching means operatively interconnected with said pick-ups adapted to be activated in response to one of said signals and deactivated in response to another of said signals, a coincidence circuit interconnected with said pick-ups and said switching means for controlling the activation of said switching means when said signals substantially coincide, said coincidence circuit comprising means responsive to substantial coincidence of said signals and operative to render both said unbalance and said reference signals ineffective to control said switching means and to simultaneously render said switching means continuously activated, and an indicator operatively interconnected with said switching means adapted to indicate the duration of activation of said switching means.

2. A measuring device for determining the dynamic unbalance in a work piece, said device comprising a motor for rotating said work piece, reference pick-up means adapted to generate an electrical pulse indicative of a predetermined angular disposition of said work piece, unbalance pick-up means adapted to produce an electrical pulse indicative of the position of the unbalance in said work piece, switching means operatively interconnected with said first and second means and responsive to said pulses to become conductive in response to one of said pulses and non-conductive in response to the other of said pulses, a coincidence circuit interconnected with said first and second means to control the conductions of said switching means when said pulses substantially coincide, said coincidence circuit including means responsive to substantial coincidence of said pulses and operative to render ineffective the operative connection between one of said pick-ups and the switching means and simultaneously render said switching means continuously conductive and an indicator interconnected with said switching means to be responsive to the duration of said conductivity.

3. A phase meter adapted to indicate the angular phase relationship between two signals, said phase meter comprising means adapted to produce a triggering pulse indicative of the phase of one of said signals, means adapted to produce a second triggering pulse indicative of the phase of the other of said signals, a phase measuring circuit operatively interconnected with said means and responsive to said triggering pulses so as to become conductive in response to one of said pulses and non-conductive in response to the other of said pulses, an indicator interconnected with said circuit and responsive to the phase difference between the extremes of 0° and 360°, a coincidence circuit responsive to said pulses and effective to control the conductance of said first circuit when said pulses substantially coincide, said coincidence circuit including pulse adding means responsive to both of said triggering pulses and having an output varying with the sum of said triggering pulses at any instant of time and means responsive to a predetermined output from said pulse adding means to render one of said triggering pulses ineffective to vary the conductance of said phase measuring circuit and simultaneously render said phase measuring circuit continuously conductive whereby said indicator will indicate 360° of phase difference.

4. A phase meter adapted to indicate the angular phase relationship between two signals, said phase meter comprising first pulse means adapted to produce a triggering pulse indicative of the phase of one of said signals, second pulse means adapted to produce a second triggering pulse indicative of the phase of the other of said signals, a first circuit operatively interconnected with said means and responsive to said triggering pulses so as to become conductive in response to one of said pulses and non-conductive in response to the other of said pulses, a second circuit responsive to both of said triggering pulses and adapted to control the conductivity of said first circuit whenever said triggering pulses are substantially coincident, an indicator adapted to indicate the duration of the conductivity of said first circuit, said second circuit including a relay controlling the interconnected between said first circuit and one of said pulse means and means responsive to coincidence of said pulses operatively connected to control said relay to render one of said triggering pulses ineffective to control the conductivity of said first circuit and simultaneously render said first circuit continuously conductive.

5. A phase meter adapted to indicate the angular phase relationship between two signals including means to convert said signals to triggering pulses having the same phase difference as the original signals, a phase measuring circuit including a flip-flop circuit having a pair of electronic devices, one of said devices connected to conduct in response to a first one of said triggering pulses, the other of said devices connected to conduct in response to the other of said pair of triggering pulses, said flip-flop circuit causing said one device to become non-conductive in response to the other device becoming conductive and the other device to become non-conductive in response to said one device becoming conductive, an averaging meter response to the average time duration said one device conducts for indicating the phase difference between said signals, a coincidence circuit responsive to said pair of signals being substantially in phase for providing an output greater than a predetermined amount when said signals are in phase, first switch means for rendering said first signal ineffective to cause the other of said devices to conduct in response to its triggering pulse, second switch means for rendering said one device continuously conductive, and relay means for controlling said first and second switch means in response to an output from said coincidence circuit greater than said predetermined amount to cause said one device to continuously conduct and said meter to indicate a maximum phase difference between said signals.

References Cited in the file of this patent

UNITED STATES PATENTS

| | | |
|---|---|---|
| 2,748,603 | Wilcox | June 5, 1956 |
| 2,783,648 | Stovall et al. | Mar. 5, 1957 |
| 2,817,971 | Gruber | Dec. 31, 1957 |
| 2,848,897 | Rambo | Aug. 26, 1958 |